United States Patent [19]

Bennison

[11] Patent Number: 5,039,274

[45] Date of Patent: Aug. 13, 1991

[54] VACUUM LIFTING APPARATUS

[75] Inventor: Stewart Bennison, Sheepbridge, England

[73] Assignee: Palamatic Handling Systems Ltd, Chesterfield, England

[21] Appl. No.: 447,715

[22] Filed: Dec. 8, 1989

[30] Foreign Application Priority Data

Dec. 10, 1988 [GB] United Kingdom ............... 8828914

[51] Int. Cl.$^5$ .............................................. B25J 1/02
[52] U.S. Cl. ........................... 414/744.5; 198/468.4; 294/64.1; 901/40; 414/752
[58] Field of Search ................. 414/744.5, 744.6, 737, 414/752; 294/64.1; 901/15, 40, 48, 22; 212/221; 198/468.4

[56] References Cited

U.S. PATENT DOCUMENTS

| 2,716,497 | 8/1955 | Wahl et al. ................. 294/64.1 X |
| 3,558,171 | 1/1971 | Netsch et al. ................. 294/64.1 |
| 3,704,038 | 11/1972 | Glanemann . |
| 3,743,340 | 7/1973 | Williamann . |
| 4,413,853 | 11/1983 | Andersson ................. 294/64.1 |
| 4,620,831 | 11/1986 | Poncet et al. .............. 414/744.5 X |
| 4,648,786 | 3/1987 | Sakurai ..................... 901/40 X |

FOREIGN PATENT DOCUMENTS

| 1584615 | 11/1969 | Fed. Rep. of Germany . |
| 2553327 | 4/1985 | France ................. 414/744.6 |
| 8102289 | 8/1981 | PCT Int'l Appl. . |
| 526461 | 9/1972 | Switzerland . |
| 541507 | 10/1973 | Switzerland . |
| 2200615 | 8/1988 | United Kingdom ........... 294/64.1 |

Primary Examiner—Robert J. Spar
Assistant Examiner—Donald W. Underwood
Attorney, Agent, or Firm—Trexler, Bushnell, Giangiorgi & Blackstone, Ltd.

[57] ABSTRACT

Vacuum lifting apparatus 1 containing a lift tube 2 which is extendable and retractable in length, and is located in an upright disposition with an upper end 3 connectable to a fixed or movable anchorage point or support 4, the lift tube interior 6 being connectable to a vacuum generating structure and each end 3, 7 of the tube 2 provided with air sealing structure, valve means 10 to connect the interior of the lift tube 2 at a controllable level to atmosphere to regulate the vacuum therein and hence the axial extension of the lift tube 2, and a relatively rigid device 11 located within the lift tube 2, which device 11 is axially displaceable or extendable and retractable with the lift tube 2 and carries at a lower end a means 14 for engaging a load to be lifted, transported and lowered.

19 Claims, 3 Drawing Sheets

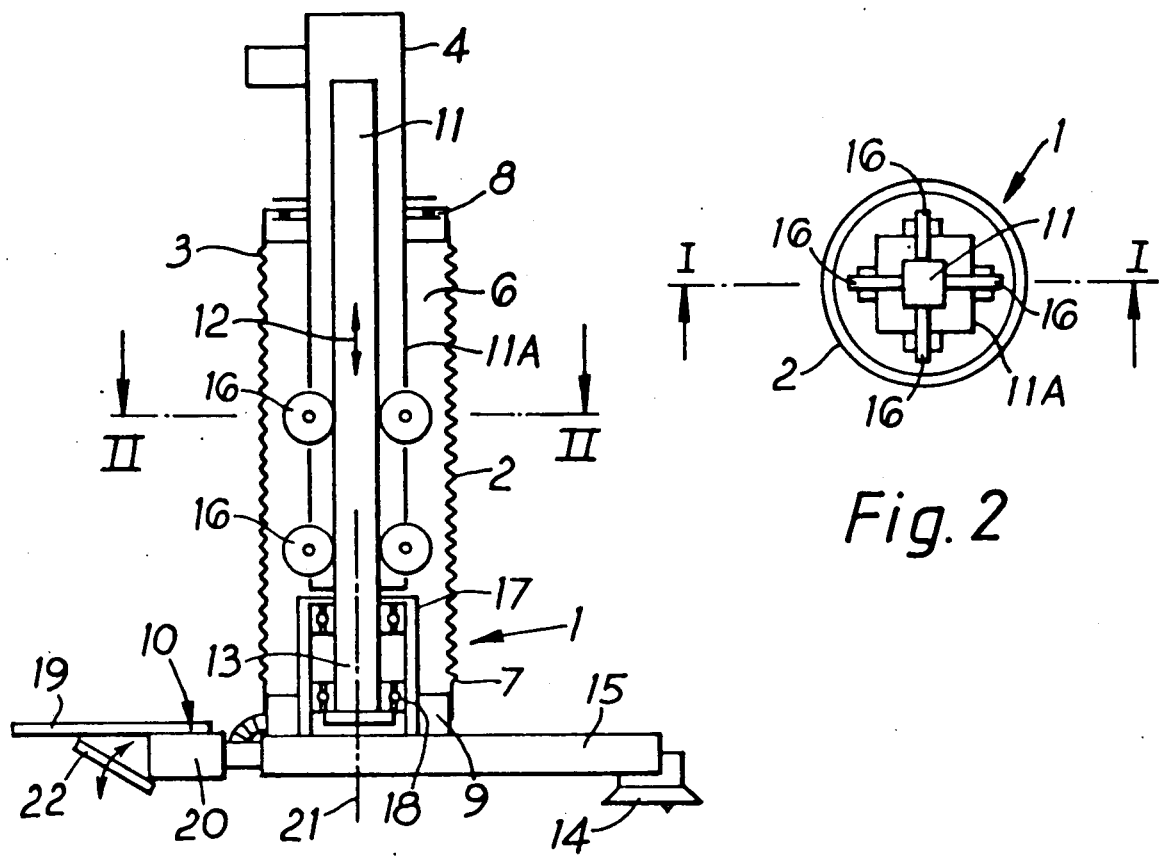
Fig. 2
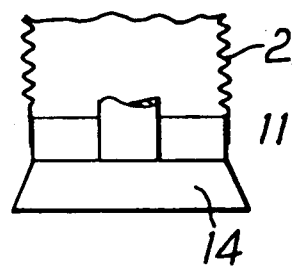
Fig. 3A
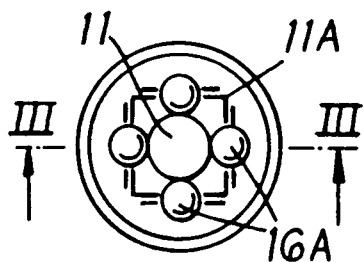
Fig. 4
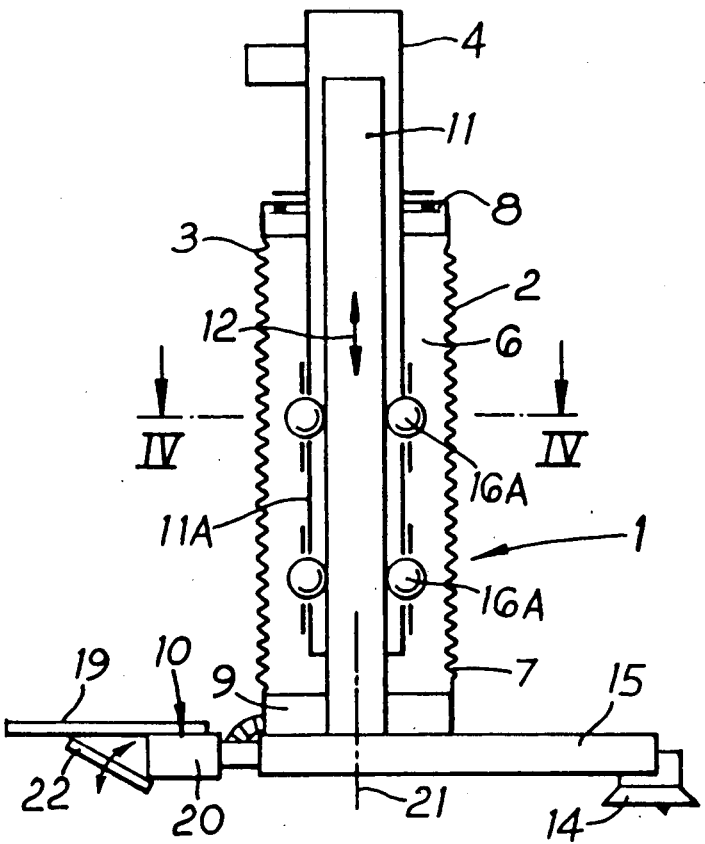
Fig. 1
Fig. 3

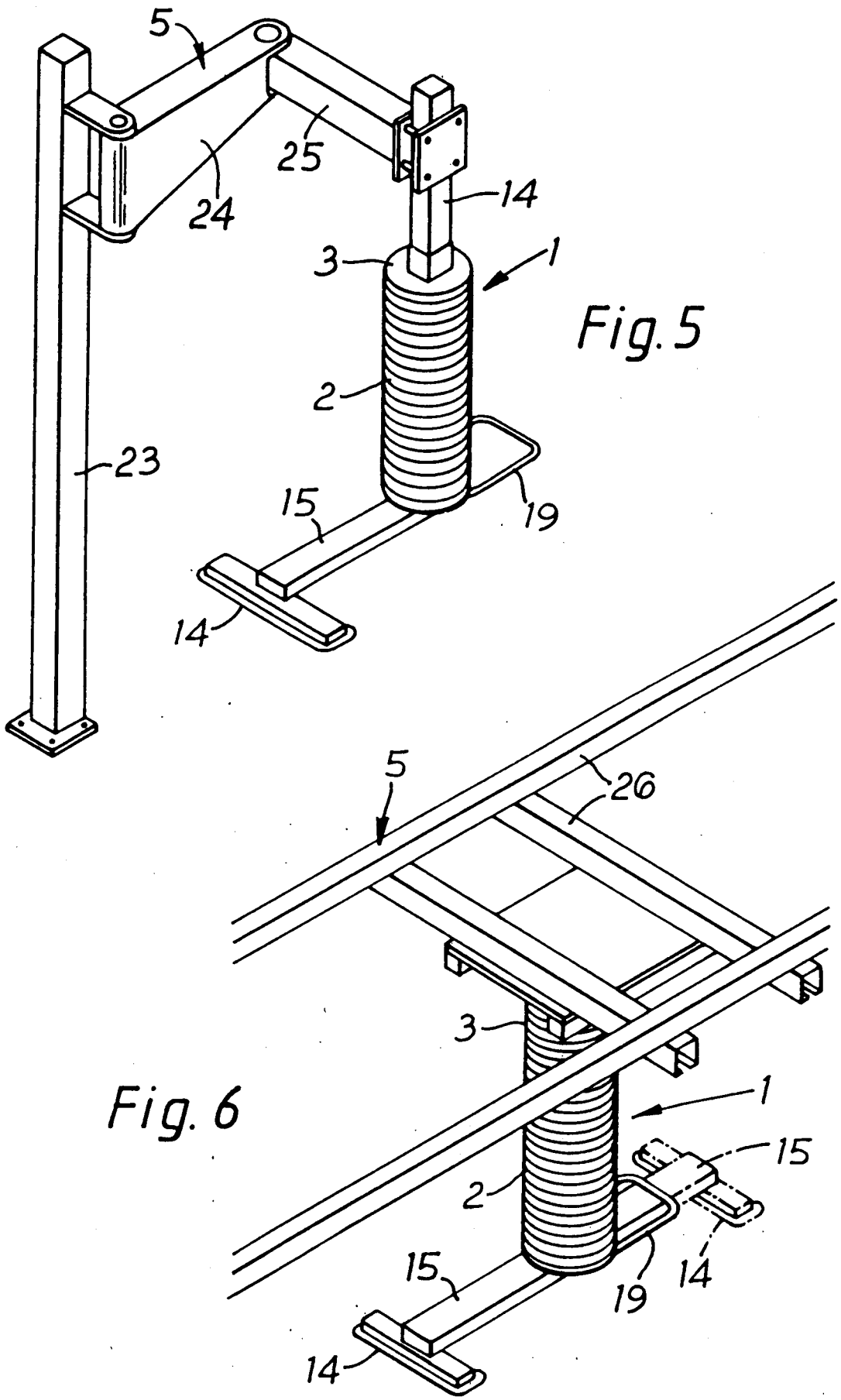

VACUUM LIFTING APPARATUS

This invention relates to a vacuum lifting apparatus of the general type described in GB 2080764B.

Whilst this known apparatus has been used for lifting all manner of objects its use has always been limited to lifting from directly above the load, as the lift tube is a flexible bellows which cannot accommodate side loading. Hence it has been impossible to offer a solution to lifting loads from a lateral location e.g., from inside a machine press or from under pallet racking or shelving or from inside a machine guard. Also it has become increasingly apparent that, when handling large boards and planks, unless the load is picked up exactly on centre-line it will not remain horizontal and, in un-trained hands, can be somewhat unnerving in operation.

According to the present invention, there is provided vacuum lifting apparatus comprising a lift tube which is extendable and retractable in length, and is adapted to be located in an upright disposition with an upper end connectable to a fixed or movable anchorage point or support, the lift tube interior being connectable to a vacuum generating means and each end of the lift tube provided with air sealing means, valve means to connect the interior of the lift tube at a controllable level to atmosphere to regulate the vacuum therein and hence the axial extension of the lift tube, and a relatively rigid device located within the lift tube, which device is axially displaceable or extendable and retractable with the lift tube and carries at a lower end a means for engaging a load to be lifted, transported and lowered.

A basic advantage of installing the axially displaceable or extendable device within lift tube is to ensure no additional bulky structures are required surrounding the lift tube. Also there is no fundamendal reduction in the lifting capacity of the appartus in accordance with the invention, except for that resulting from the weight of the additional components attached to the load engaging means, but basically the invention results in a rigidised lift tube, whereby the apparatus is capable, inter alia, of lifting and lowering lateral loads, remote from the centre line of the lift tube.

The load engaging means may be attached directly to the lower end of the lift tube. Alternatively the load engaging means may be attached indirectly to the lower end of the lift tube, via a beam, which may be symmetrical, extending equally to opposite sides of the longitudinal axis of the lift tube e.g., with a load engaging means at each end, and possibly intermediate the two ends, (which arrangement is suitable for lifting sheets of timber, glass etc), or which may be asymmetrical, extending to one side only of the longitudinal axis of the lift tube, with a load engaging means carried at the end of this beam distal from the lift tube (which arrangement is suitable for penetrating pallet racking or shelving for instance).

In detail, the lift tube may be extendable and retractable by being constituted by a bellows, preferably reinforced by a spiral spring.

The axially displaceable or extendable device may, in one embodiment, be constituted by a telescopic device e.g., generally of piston and cylinder form, with an inner elongate member axially displaceable with respect to an outer elongate member, preferably with friction reducing or eliminating bearing means between the inner and outer members. Thus, if the inner member is of square section the bearing means may comprise four rollers located 90° apart around the inner member, the periphery of each roller engaging one face of the member, while if the inner member is tubular, four balls instead of rollers may be employed, also located 90° apart, to engage around the inner member. Preferably, two sets of rollers or balls are provided, the sets being axially spaced apart. With a square section inner member, a rotating connection, also preferably incorporating axially spaced-apart bearing means, is required between the lower end of the inner member and the laterally extending member, if a facility for arcuate movement of the load engaging means, e.g. a laterally extending member, is required.

The same principles can be used on an apparatus incorporating double or triple lift tubes, while if four, six or eight lift tubes were involved, preferably a piston and cylinder type extendable device would be replaced by an inverted scissor device to ensure complete rigidity e.g. when handling up to ½ ton loads on fully automated equipment.

The apparatus may be floor mounted on a vertical column with at least one, and preferably two, arms interposed between the column and the apparatus. With one arm arrangement, the latter is pivotally attached to the column, while with a two arm arrangement a second arm is pivotally attached to a first arm which is pivotally attached to the column.

Alternatively, the apparatus may be rendered mobile by being mounted on an overhead conveyor system.

Preferably the laterally extending member is constituted by a beam.

The load engaging means preferably takes the form of a suction foot. If however, this is unsuitable for the particular load to be handled, then this may be supplemented or replaced by mechanical and/or electromagnetic grippers.

The invention will now be described in greater detail, by way of examples, with reference to the accompanying drawings, in which:

FIG. 1 is a diagrammatic sectional view through a first embodiment of vacuum lifting apparatus in accordance with the invention, being a section on the line I—I of FIG. 2;

FIG. 2 is a section on the line II—II of FIG. 1;

FIG. 3 corresponds to FIG. 1 but shows a second embodiment and is a section on the line III—III of FIG. 4;

FIG. 3A illustrates an alternative attachment of the load engaging means.

Figure 7:
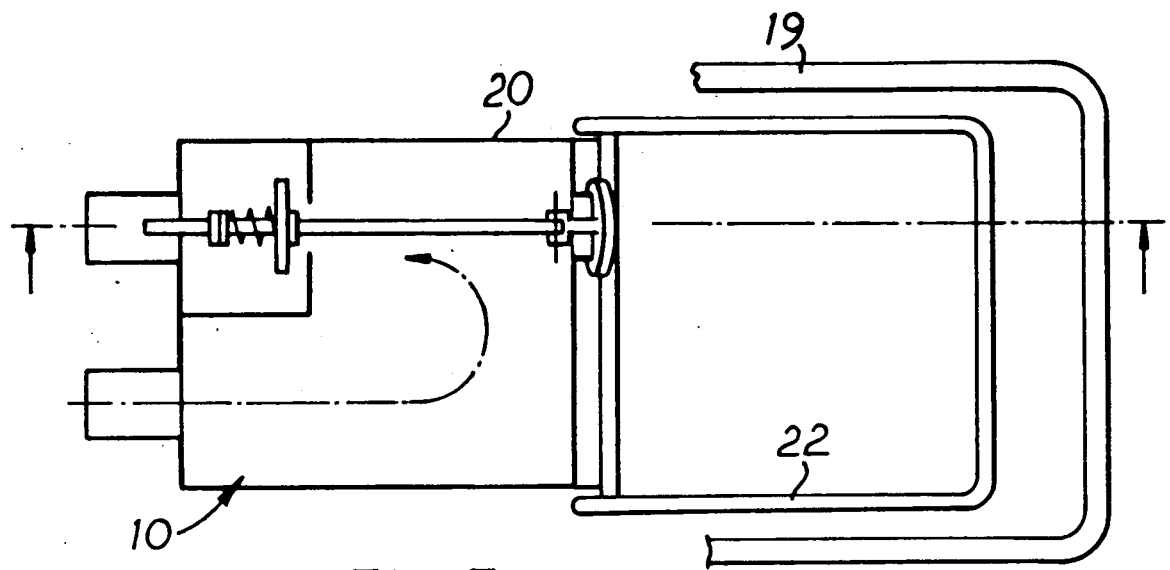
Figure 8:
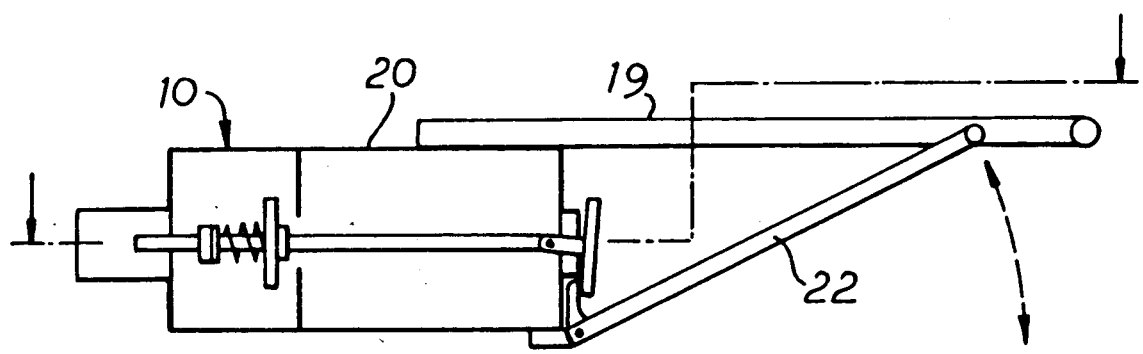
Figure 9:
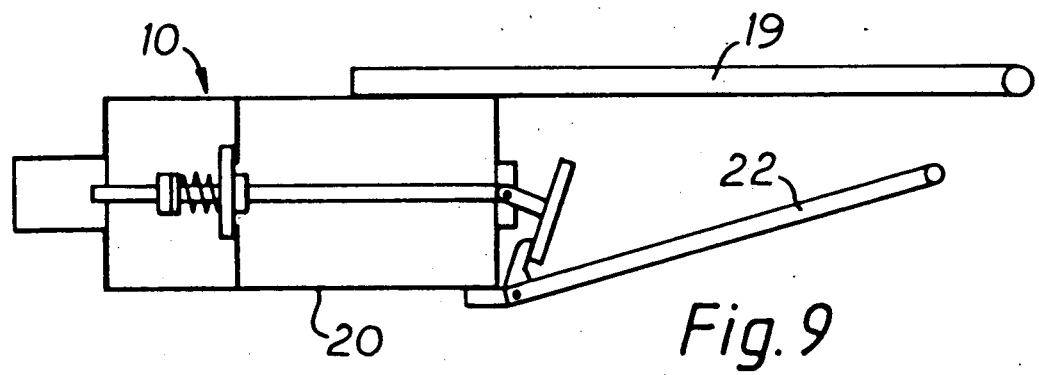

FIG. 4 is a section on the line IV—IV of FIG. 3;

FIG. 5 shows the apparatus of FIGS. 1 and 2, or FIGS. 3 and 4 attached to a static mounting in the form of a column, FIG. 6 shows the apparatus of FIGS. 1 and 2, or FIGS. 3 and 4 attached to a mobile mounting, and FIGS. 7-9 show details of the valve means of FIGS. 1-6.

In the drawings, vacuum lifting apparatus 1 comprises a lift tube 2 of known construction comprising an extendable and retractable bellows reinforced by a spiral spring. The lift tube 2 is adapted to be located in an upright disposition, as indicated in FIGS. 1, 3, 5 and 6, with an upper end 3 connected to a fixed support 4 (as illustrated in FIGS. 1 and 3) or a mobile support 5 (as illustrated in FIGS. 5 and 6). The lift tube 2 has an interior 6 connectable to a vacuum generating means (not shown) and the upper and lower ends 3, 7 of the lift tube 2 are provided with air sealing means, being an upper, rotary seal 8 and a lower seal 9. A valve means 10 is connected to the interior 6 of the lift tube 2, to connect the interior 6, in a controlled manner, to atmosphere, whereby the vacuum level within the interior 6, and hence the axial extension of the lift tube, is controlled, to provide the up and down movements required during load handling operations. Within the lift tube 2 is located a relatively rigid device in the form of a rod 11, e.g. of lightweight alloy, which rod 11 is axially displaceable, or extendable and retractable, simultaneously with the lift tube 2, as indicated by the arrow 12. The rod 11 carries at a lower end 13 means for engaging a load to be lifted, transported and lowered, which means is constituted by a suction foot 14 of known construction. The foot 14 may be attached to the rod 11 indirectly, via an interposed, laterally extending beam 15, as illustrated in FIGS. 1, 3, 5, and 6; or alternatively may be attached directly to the rod 11, as illustrated in FIG. 3A. The beam 15 may be asymmetrical, as illustrated in FIGS. 1, 3 and 5, with the valve means 10 located diammetrically opposite the beam to assist counterbalancing of the latter, or alternatively may be symmetrical, as illustrated in FIG. 6.

The rod 11 is located within an outer, elongate casing 11A which, together with the rod 11, constitutes a piston and cylinder telescopic device. In this embodiment, the upper end 3 is attached to the casing 11A, which is in turn attached to the support 4 or 5. In the embodiment of FIGS. 1 and 2, the rod 11 is of square section, and a friction-reducing bearing means is provided, comprising two axially-spaced sets of four rollers 16, located 90° apart, and carried by the casing 11A, the periphery of each roller 16 engaging one of the four faces of the square rod 11. In the embodiment of FIGS. 3 and 4, the rod 11 is tubular, and two axially spaced sets of four balls 16A, also located 90° apart, are carried by the casing 11A and engage around the rod 11. In the embodiment of FIGS. 1 and 2, a rotating connection 17, also incorporating axially spaced-apart bearing means 18 is provided between the lower end of the rod 11 and the beam 15.

The apparatus 1 is particularly adapted for manual operation, for which purpose a square "U"-shaped hand grip 19 is attached to a housing 20 of the valve means 10, whereby the apparatus 1 may be manually manoeuvred, particularly by rotation about the longitudinal axis 21 of the lift tube 2, while a similar, square "U"-shaped valve actuation lever 22 is pivotally attached to the housing 20, for one-handed control by the operator.

As illustrated in FIG. 5, the apparatus 1 may be floor mounted on a vertical column 23, with two arms 24, 25 interposed between the column 23 and the apparatus 1, the second arm 25 being pivotally attached to the first arm 24, which is pivotally attached to the column 23.

As illustrated in FIG. 6, the apparatus may, alternatively, be mobile by being mounted on an overhead conveyor system 26, and furthermore, as indicated in chain-dotted line, the beam 15 may be extended equally to opposite sides of the lift tube 2, with each end of the beam provided with a suction foot 14.

What I claim is:

1. Vacuum lifting apparatus comprising a bellows-like lift tube which is extendable and retractable in length, and is adapted to be located in an upright disposition, an upper end of said lift tube connectable to a support, an interior of said lift tube being connectable to a vacuum pump, an air sealing means being provided at each end of said lift tube, manually operable valve means to connect said interior of said lift tube at a controllable level to atmosphere to regulate said vacuum therein and hence the axial extension and retraction of said lift tube, and a relatively rigid telescopic device located substantially wholly within and extendable and retractable in length as said lift tube extends and retracts in length, which device is connected to said air sealing means, and means for engaging a load to be lifted, transported and lowered, carried at a lower end of said lift tube.

2. Vacuum lifting apparatus as claimed in claim 1, wherein said load engaging means is attached directly to said lower end of said lift tube.

3. Vacuum lifting apparatus as claimed in claim 1, wherein said load engaging means is attached indirectly to said lower end of said lift tube, a beam being interposed between said load engaging means and said lift tube.

4. Vacuum lifting apparatus as claimed in claim 3, wherein said beam is symmetrical, extending equally to opposite sides of a longitudinal axis of said lift tube.

5. Vacuum lifting apparatus as claimed in claim 4, wherein a load engaging means is provided at each end of said beam.

6. Vacuum lifting apparatus as claimed in claim 3, wherein said beam is asymmetrical, extending to one side only of a longitudinal axis of said lift tube.

7. Vacuum lifting apparatus as claimed in claim 6, wherein a load engaging means is carried at an end of said beam distal from said lift tube.

8. Vacuum lifting apparatus as claimed in claim 1, wherein a spiral spring reinforces said bellows.

9. Vacuum lifting apparatus as claimed in claim 1, wherein said telescopic device is of piston and cylinder form, with an inner, elongate member axially displaceable with respect to an outer, elongate member.

10. Vacuum lifting apparatus as claimed in claim 9, comprising friction reducing or eliminating bearing means between said inner and outer members.

11. Vacuum lifting apparatus comprising a lift tube which is extendable and retractable in length, and is adapted to be located in an upright disposition, an upper end of said lift tube connectable to a support, an interior of said lift tube being connectable to a vacuum generating means, an air sealing means being provided at each end of said lift tube, manually operable valve means to connect said interior of said lift tube at a controllable level to atmosphere to regulate said vacuum therein and hence the axial extension and retraction of said lift tube, and a relatively rigid device located within and extendable and retractable in length as said lift tube extends and retracts in length, which device is connected to said air sealing means, and means for engaging a load to be lifted, transported and lowered, carried at a lower end of said lift tube, wherein said axially displaceable device comprises a telescopic device of piston and cylinder form, with an inner, elongate member axially displaceable with respect to an outer, elongate member, including friction reducing or eliminating bearing means between said inner and outer members, wherein, said inner member is of square section, and said bearing means comprises a set of four rollers, located 90° apart, around said inner member, a periphery of each said roller engaging one face of said square section member.

12. Vacuum lifting apparatus comprising a lift tube which is extendable and retractable in length, and is adapted to be located in an upright disposition, an upper end of said lift tube connectable to a support, an interior of said lift tube being connectable to a vacuum generating means, an air sealing means being provided at each end of said lift tube, manually operable valve means to connect said interior of said lift tube at a controllable level to atmosphere to regulate said vacuum therein and hence the axial extension and retraction of said lift tube, and a relatively rigid device located within and extendable and retractable in length as said lift tube extends and retracts in length, which device is connected to said air sealing means, and means for engaging a load to be lifted, transported and lowered, carried at a lower end of said lift tube, wherein said axially displaceable device comprises a telescopic device of piston and cylinder form, with an inner, elongate member axially displaceable with respect to an outer, elongate member, including friction reducing or eliminating bearing means between said inner and outer members, wherein, said inner member is tubular and a set of four balls constitute said bearing means, said balls being located 90° apart around said inner member, to engage said inner member.

13. Vacuum lifting apparatus as claimed in claim 11, wherein two sets of said rollers are provided, said sets being axially spaced apart.

14. Vacuum lifting apparatus as claimed in claim 12, wherein two sets of said balls are provided, said sets being axially spaced apart.

15. Vacuum lifting apparatus as claimed in claim 11, wherein a rotating connection is provided between a lower end of said inner member and a laterally extending member.

16. Vacuum lifting apparatus as claimed in claim 15, wherein spaced-apart bearing means are incorporated in said rotating connection.

17. Floor mounted vacuum lifting apparatus as claimed in claim 1, attached to a vertical column via two arms being with a first arm pivotally attached to said column, a second arm pivotally attached to said first arm, with said vacuum lifting apparatus attached to said second arm.

18. Mobile vacuum lifting apparatus as claimed in claim 1, mounted on an overhead conveyor system.

19. Vacuum lifting apparatus as claimed in claim 1, wherein a suction foot constitutes said load engaging means.

* * * * *